United States Patent
Dollase et al.

(10) Patent No.: US 10,759,973 B2
(45) Date of Patent: *Sep. 1, 2020

(54) ADHESIVE MASS, IN PARTICULAR FOR STRIPPABLE ADHESIVE STRIPS AND USE FOR ADHERING ON COATED WOODCHIP WALLPAPER

(71) Applicant: TESA SE, Norderstedt (DE)

(72) Inventors: Thilo Dollase, Hamburg (DE); Tanja Altenwegner, Hamburg (DE); Julia Garbers, Hamburg (DE)

(73) Assignee: TESA SE, Norderstedt (DE)

( * ) Notice: Subject to any disclaimer, the term of this patent is extended or adjusted under 35 U.S.C. 154(b) by 109 days.

This patent is subject to a terminal disclaimer.

(21) Appl. No.: 15/767,229

(22) PCT Filed: Oct. 13, 2016

(86) PCT No.: PCT/EP2016/074547
§ 371 (c)(1),
(2) Date: Apr. 10, 2018

(87) PCT Pub. No.: WO2017/064167
PCT Pub. Date: Apr. 20, 2017

(65) Prior Publication Data
US 2019/0078000 A1 Mar. 14, 2019

(30) Foreign Application Priority Data
Oct. 15, 2015 (DE) .................. 10 2015 220 065

(51) Int. Cl.
| | |
|---|---|
| C09J 7/00 | (2018.01) |
| C09J 153/02 | (2006.01) |
| C08L 91/00 | (2006.01) |
| C09J 109/00 | (2006.01) |
| C09J 125/10 | (2006.01) |
| C09J 7/38 | (2018.01) |
| C09J 109/06 | (2006.01) |

(52) U.S. Cl.
CPC .............. *C09J 7/387* (2018.01); *C08L 91/00* (2013.01); *C09J 109/00* (2013.01); *C09J 109/06* (2013.01); *C09J 125/10* (2013.01); *C09J 153/02* (2013.01); *C09J 2201/618* (2013.01); *C09J 2201/622* (2013.01); *C09J 2400/226* (2013.01); *C09J 2400/243* (2013.01)

(58) Field of Classification Search
USPC .......................................................... 525/98
See application file for complete search history.

(56) References Cited

U.S. PATENT DOCUMENTS

| | | |
|---|---|---|
| 3,958,484 A | 5/1976 | Nelson et al. |
| 4,024,312 A | 5/1977 | Korpman |
| 5,409,189 A | 4/1995 | Luehmann |
| 5,491,012 A | 2/1996 | Lühmann et al. |
| 5,507,464 A | 4/1996 | Hamerski et al. |
| 5,516,581 A | 5/1996 | Kreckel et al. |
| 5,626,931 A | 5/1997 | Luehmann |
| 5,626,932 A | 5/1997 | Luehmann et al. |
| 5,672,402 A | 9/1997 | Kreckel et al. |
| 5,897,949 A | 4/1999 | Lühmann et al. |
| 5,967,474 A | 10/1999 | doCanto et al. |
| 6,004,665 A | 12/1999 | Lühmann et al. |
| 6,231,962 B1 * | 5/2001 | Bries ...................... A47G 1/175 428/317.3 |
| 6,245,177 B1 | 6/2001 | Lühmann |
| 6,342,720 B1 | 1/2002 | Presting et al. |
| 6,372,335 B1 | 4/2002 | Luehmann et al. |
| 6,395,389 B1 | 5/2002 | Lühmann et al. |
| 6,402,875 B1 | 6/2002 | Lühmann et al. |
| 6,403,206 B1 | 6/2002 | Bries et al. |
| 6,544,639 B1 | 4/2003 | Lühmann et al. |
| 6,641,892 B2 | 11/2003 | Lühmann |
| 6,841,241 B2 | 1/2005 | Lühmann et al. |
| 6,874,740 B1 | 4/2005 | Leiber et al. |
| 6,984,428 B2 | 1/2006 | Krawinkel et al. |
| 7,101,615 B2 | 9/2006 | Lühmann et al. |
| 7,264,870 B2 | 9/2007 | Luehmann et al. |
| 7,276,272 B2 | 10/2007 | Mizuno et al. |
| 8,128,781 B2 | 3/2012 | Krawinkel et al. |
| 8,721,832 B2 | 5/2014 | Krawinkel et al. |
| 2002/0017359 A1 | 2/2002 | Luhmann |
| 2002/0034628 A1 | 3/2002 | Luhmann et al. |
| 2002/0051875 A1 | 5/2002 | Luhmann et al. |
| 2002/0168516 A1 | 11/2002 | Luhmann et al. |
| 2004/0110882 A1 | 6/2004 | Krawinkel et al. |
| 2005/0044366 A1 | 2/2005 | Pucheral et al. |
| 2008/0135159 A1 | 6/2008 | Bries et al. |
| 2008/0169062 A1 | 7/2008 | Kishimoto et al. |
| 2008/0220188 A1 | 9/2008 | Donohoe et al. |
| 2008/0271846 A1 | 11/2008 | Krawinkel et al. |
| 2009/0163660 A1 | 6/2009 | Krawinkel et al. |
| 2009/0277561 A1 | 11/2009 | Ellringmann et al. |
| 2010/0148127 A1 * | 6/2010 | Ellinger ............... C09J 123/142 252/500 |

(Continued)

FOREIGN PATENT DOCUMENTS

| | | |
|---|---|---|
| DE | 33 31 016 A1 | 10/1984 |
| DE | 42 22 849 C1 | 6/1993 |

(Continued)

OTHER PUBLICATIONS

C. Donker, PSTC Annual Technical Seminar, Proceedings, pp. 149-164, May 2001.

*Primary Examiner* — Fred M Teskin
(74) *Attorney, Agent, or Firm* — Norris McLaughlin, P.A.

(57) ABSTRACT

An adhesive mass consisting of (a) at least one elastomer component, of a polybutadiene-polyvinyl aromatic block copolymer type, having a proportion with respect to the total adhesive mass of 42 to 55 wt. % and having a diblock proportion with respect to the total block copolymer content of 32 to 55 wt. %, (b) at least one adhesive resin, which is a hydrocarbon resin having a DACP value of at least +50° C. and at most +85° c, (c) optionally at least one soft resin having a proportion of 0 to 15 wt. % with respect to the total adhesive mass, and (d) optionally further additives, which adhesive mass is particularly suitable for adhering on rough substrates such as plaster or woodchip wallpaper.

10 Claims, 1 Drawing Sheet

(56) References Cited

U.S. PATENT DOCUMENTS

| | | |
|---|---|---|
| 2016/0068722 A1 | 3/2016 | Schmitz-Stapela et al. |
| 2017/0335038 A1* | 11/2017 | Li .......................... C08L 53/02 |
| 2019/0077998 A1* | 3/2019 | Dollase .................... B32B 5/18 |
| 2019/0078000 A1 | 3/2019 | Dollase et al. |

FOREIGN PATENT DOCUMENTS

| | | |
|---|---|---|
| DE | 42 33 872 A1 | 3/1994 |
| DE | 44 28 587 A1 | 2/1996 |
| DE | 44 31 914 A1 | 3/1996 |
| DE | 195 11 288 A1 | 10/1996 |
| DE | 195 31 696 A1 | 3/1997 |
| DE | 196 49 729 A1 | 5/1997 |
| DE | 296 23 112 U1 | 10/1997 |
| DE | 197 08 366 A1 | 1/1998 |
| DE | 196 49 636 A1 | 6/1998 |
| DE | 196 49 727 A1 | 6/1998 |
| DE | 196 49 728 A1 | 6/1998 |
| DE | 297 23 198 U1 | 8/1998 |
| DE | 197 08 364 A1 | 9/1998 |
| DE | 197 20 145 A1 | 11/1998 |
| DE | 197 23 177 A1 | 12/1998 |
| DE | 198 13 081 A1 | 1/1999 |
| DE | 297 23 614 U1 | 1/1999 |
| DE | 197 56 816 A1 | 2/1999 |
| DE | 197 56 084 A1 | 7/1999 |
| DE | 198 20 854 A1 | 8/1999 |
| DE | 198 42 864 A1 | 3/2000 |
| DE | 198 42 865 A1 | 3/2000 |
| DE | 100 03 318 A1 | 8/2001 |
| DE | 10 2004 030 252 A1 | 1/2006 |
| DE | 10 2007 063 083 A1 | 6/2009 |
| DE | 10 2008 023 741 A1 | 11/2009 |
| DE | 10 2008 038 471 A1 | 2/2010 |
| DE | 10 2013 206 624 A1 | 10/2014 |
| DE | 20 2015 009 135 U1 | 11/2016 |
| EP | 0 845 515 A2 | 6/1998 |
| EP | 845 513 A2 | 6/1998 |
| EP | 845 514 A2 | 6/1998 |
| EP | 878 526 A2 | 11/1998 |
| EP | 1 415 215 A1 | 5/2004 |
| EP | 1 341 862 B1 | 6/2005 |
| EP | 1 988 141 A1 | 11/2008 |
| EP | 1 988 144 A1 | 11/2008 |
| EP | 2 130 885 A1 | 12/2009 |
| WO | 92/01132 A1 | 1/1992 |
| WO | 94/21157 A1 | 9/1994 |
| WO | 95/06691 A1 | 3/1995 |
| WO | 97/07172 A1 | 2/1997 |
| WO | 98/03601 A1 | 1/1998 |
| WO | 99/31193 A1 | 6/1999 |
| WO | 92/11333 A1 | 7/1999 |
| WO | 99/37729 A1 | 7/1999 |
| WO | 99/63018 A1 | 12/1999 |
| WO | 2002/024840 A1 | 3/2002 |
| WO | 2002/038692 A2 | 5/2002 |

* cited by examiner

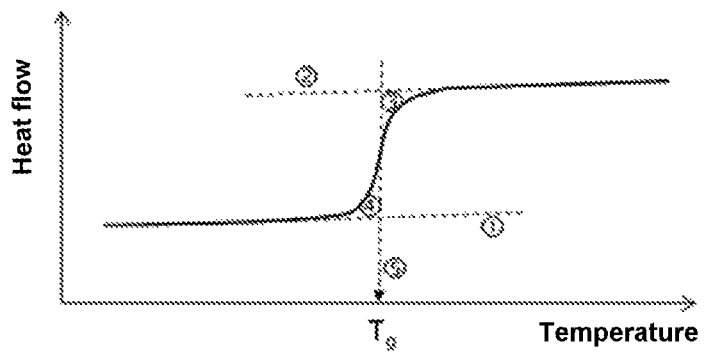

ADHESIVE MASS, IN PARTICULAR FOR STRIPPABLE ADHESIVE STRIPS AND USE FOR ADHERING ON COATED WOODCHIP WALLPAPER

This is a 371 of PCT/EP2016/074547 filed 13 Oct. 2016, which claims foreign priority benefit under 35 U.S.C. 119 of German Patent Application 10 2015 220 065.5 filed Oct. 15, 2015, the entire contents of which are incorporated herein by reference.

The present invention relates to an adhesive based on polybutadiene-polyvinylaromatic block copolymers, to an adhesive tape comprising this adhesive, and to the use of such an adhesive or such an adhesive tape.

BACKGROUND OF THE INVENTION

Adhesives with high bonding and holding performance, which are detachable without residue from a bonding substrate by means of extensive stretching, are known. Adhesives for this purpose may be formulated advantageously on the basis of vinylaromatic block copolymers and tackifier resins.

The diverse applications of adhesive strips featuring such adhesives include bonds to walls, and more specifically not only to smooth, planar substrates, but in particular also to any rougher surfaces such as plaster, wood, woodchip wallpaper, especially coated woodchip wallpaper, other textured wallpapers, panels, or wall boards. Here as well there is a desire to affix articles, even those of high weight, without damaging the substrate (the wall). In the case of adhesive bonding, to coated woodchip wallpaper, for example, there are three particular challenges which arise, however, by comparison with numerous other substrates: (a) woodchip wallpaper is not a smooth bonding substrate; (b) the surface of the woodchip wallpaper typically carries a paint, which because of binders and/or additives may have a low surface energy; (c) woodchip wallpaper in particular constitutes a relatively easily splittable bonding substrate, which is not to be damaged during redetachment. The surface properties may vary greatly according to the nature of the paint. A further aspect is the moisture content of the coated woodchip wallpaper, which is dependent on the time of day, the season, and the geographical region, and which accordingly may also be subject to temporary fluctuations. For others in the list of example substrates given above, all or some of these challenges are applicable similarly. For these purposes, suitable adhesives are required. Also required are adhesive strips featuring adhesives with high bonding and holding performance which can be detached without residue and as far as possible without destruction from coated plaster or other rough surfaces, by extensive stretching.

Pressure-sensitive adhesive strips which have a high elastic or plastic extensibility and which are redetachable without residue or destruction by extensive stretching in the bond plane are known from, for example, U.S. Pat. No. 4,024,312 A, DE 33 31 016 C2, WO 92/01132 A1, WO 92/11333 A1, DE 42 22 849 A1, WO 95/06691 A1, DE 195 31 696 A1, DE 197 08 366 A1, DE 196 49 727 A1, DE 196 49 728 A1, DE 196 49 729 A1, DE 197 08 364 A1, DE 197 20 145 A1, DE 198 20 854 A1, and DE 100 03 318 A1, and below are also referred to as strippable pressure-sensitive adhesive strips or simply as (adhesive) strips. For these adhesive products it is possible with particular advantage to use formulations comprising styrene block copolymer.

The application of bonding adhesive strips to woodchip wallpaper has likewise been described before in principle, and is a typical application in the household and in offices.

DE 10 2004 030 252 A1 describes a hook system to be affixed to a rough substrate, this system allowing the adhesive strip to be detached nondestructively from the sensitive surface. Specific embodiments of the adhesive of the adhesive strip redetachable by extensive stretching are not given.

EP 845 513, EP 845 514, and EP 878 526 describe requirements associated with bonding to rough substrates, and observe that high bond strengths can in general be achieved on smooth and firm substrates using the self-adhesive tapes identified before. On rough substrates, there are numerous applications for which the bond strength is inadequate, especially for products of low thickness, but also for self-adhesive tapes of relatively high layer thickness. The cause of the inadequate bond strength is assumed to be an insufficient bond area, owing to inadequate conformability of the adhesive tapes to rough and irregular surfaces. As a solution, EP 845 513 A2 proposes the use of specific foam carriers in the adhesive products. Pressure-sensitive adhesives employed are preferably those based on block copolymers containing polymer blocks formed from vinylaromatics, preferably styrene, and blocks formed by polymerization of 1,3-dienes, preferably butadiene and isoprene. Block copolymers of these kinds can be used with a variety of architectures, and hence diblock copolymers may also be present. Typical concentrations in which the styrene block copolymers are used are located in the range between 15 wt % and 75 wt %, preferably in the range between 30 wt % and 60 wt %, more preferably in the range between 35 wt % and 55 wt %. Nothing is said about the fraction of diblock copolymers in relation to the total block copolymer content. One exemplary adhesive is composed of a mixture of a polystyrene-polybutadiene block copolymer (Vector 8505), a polystyrene-polyisoprene block copolymer (Vector 4211), and an ester of a partially hydrogenated rosin as tackifier resin. These block copolymers contain substantially no diblock copolymers.

U.S. Pat. No. 6,231,962 B1 and U.S. Pat. No. 6,403,206 B1 likewise describe double-sided adhesive strips featuring a foam carrier. Bonding substrates indicated for bonding applications are sensitive, easily splittable substrates such as painted wall panels, but not particularly rough substrates such as coated woodchip wallpaper. The adhesive used may comprise formulations based on styrene block copolymer. In specific example formulations, mineral oil is utilized to be as plasticizer. This is a disadvantage in the context of application to woodchip wallpaper, since the substrate may become saturated with grease, and this saturation may remain visible after removal of the adhesive strip.

EP 1 988 144 A1 proposes adhesives which in relation to the total resin amount contain at least 40% of a plasticizing resin. Stated applications include the bonding of lightweight (papers) to moderately heavy objects to woodchip wallpaper. The objective of such formulations is not that of high holding power, but instead the possibility of parting the bond, even from woodchip wallpaper, by extensive stretching or peeling. The diblock content of the elastomers is not specifically claimed. The examples describe formulations which have a diblock content either of >45% (example 1) or of <30% (examples 2-4).

U.S. Pat. No. 7,276,272 B2 describes double-sided adhesive strips which are redetachable even from sensitive substrates such as plaster, paint, or wallpaper. No bonding substrates featuring particularly pronounced roughness are indicated. For adhesives, moreover, reference is made merely to earlier general texts relating to strippable adhesive products (U.S. Pat. No. 4,024,312, U.S. Pat. No. 5,516,581, U.S. Pat. No. 6,231,962, and DE 33 31 016) WO 2002/038692 A2 describes adhesive products which are redetachable without residue or destruction by extensive stretching in the bond plane and which feature an adhesive based on styrene block copolymers with specific aging inhibitors that exhibit reduced propensity for discoloration on the bonding substrate. For these products, bonding to coated woodchip wallpaper, for example, is described. The text does not disclose any polystyrene-polybutadiene block copolymer-containing adhesives with a specific ratio of triblock copolymer to diblock copolymer.

DE 10 2007 063 083 A1 describes styrene block copolymer-based adhesives for nonpolar substrates. For this purpose, the adhesives described therein are admixed with a high fraction of a plasticizing resin. The amount claimed is at least 30%, based on the total resin amount. Moreover, the adhesive comprises at least two block copolymers, of which the first is a diblock copolymer and the second may be a multiblock copolymer, in the simplest case a triblock copolymer. The diblock fraction, relative to the total block copolymer content, is at least 50%. Adhesive products based on such adhesives and redetachable without residue or destruction by extensive stretching in the bond plane are not specified in the text, and nor is the use on rough substrates.

WO 2000/024840 A1 describes styrene block copolymer-based adhesives for nonpolar substrates. The adhesive comprises at least two block copolymers, of which the first is a diblock copolymer and the second may be a multiblock copolymer, in the simplest case a triblock copolymer. The diblock fraction, relative to the total block copolymer content, is at least 40% and at most 95%. Bonding to rough substrates, and adhesive products which are redetachable without residue or destruction by extensive stretching in the bond plane, are not specified. Formulations that are explicitly specified always contain mineral oil, leading to the risk of grease saturation on woodchip wallpaper.

DE 10 2013 2106 624 A1 describes adhesive products which are redetachable without residue or destruction by extensive stretching in the bond plane and which feature an adhesive based on styrene block copolymers, particular features being transparency and ozone stability. It is possible to utilize mixtures of triblock copolymers and diblock copolymers. The diblock copolymer fraction in the total block copolymer content is at most 50%. Tip-shear loading on woodchip wallpaper is not mentioned. Explicit examples have a diblock content of <30%.

DE 10 2008 023 741 teaches pressure-sensitive adhesives containing styrene block copolymer, with a total block copolymer content of at least 50%, for bonding printing plates.

Applications on woodchip wallpaper, and redetachability performed by extensive stretching, are not mentioned. Examples with polystyrene-butadiene block copolymers contain 60% of elastomer, based on the adhesive.

There continues to be a demand for adhesives which, for self-adhesive strips redetachable by extensive stretching, are especially suitable for rough substrates, particularly on coated woodchip wallpaper.

The desire is therefore for pressure-sensitive adhesives for self-adhesive strips redetachable by extensive stretching, more particularly for bonding to splittable and/or rough and/or coated substrates, with high bonding and holding performance.

SUMMARY OF THE INVENTION

This object is achieved by means of specific adhesive formulations which are characterized as follows. They consist of
  (a) at least one elastomer component of the type of a polybutadiene-polyvinylaromatic block copolymer having a fraction in relation to the total adhesive of 42 wt % to 55 wt %, more particularly to 50 wt %, and a diblock fraction in relation to the total block copolymer content of 32 wt % to 55 wt %, preferably to 50 wt %,
  (b) at least one tackifier resin which is a hydrocarbon resin having a DACP of at least +5° C. and at most +50° C. and an MMAP of at least +50° C. and at most +85° C.,
  (c) optionally at least one plasticizing resin having a fraction of 0 wt % to 15 wt %, based on the total adhesive,
  (d) optionally further additives.

"Consist of" or "consisting of" in the sense of the present invention means that a formulation or adhesive contains only the specified compounds and that over and above these there are no further ingredients present.

(a) Elastomer (Block Copolymer)

DETAILED DESCRIPTION

BRIEF DESCRIPTION OF THE DRAWING

FIG. 1 illustrates the determination of glass transition temperature by dynamic scanning colorimetry.

Employed as elastomer component (block copolymer component), preferably to an extent of at least 90 wt % (based on the total block copolymer content), is a polybutadiene-polyvinylaromatic block copolymer or a mixture of different polybutadiene-polyvinylaromatic block copolymers. This polybutadiene-polyvinylaromatic block copolymer or these polybutadiene-polyvinylaromatic block copolymers are copolymers comprising polymer blocks predominantly formed of vinylaromatics (A blocks), preferably styrene, and blocks predominantly formed by polymerization of 1,3-butadiene (B blocks). Polybutadiene block copolymers (SBS) are preferred for the purposes of this invention on account of their greater stability with respect to external influences such as ozone, for example, in comparison to polyisoprene block copolymers (SIS). SIS-containing formulations can typically not be transposed 1:1 onto SBS-containing and SIS-free formulations, if a comparable mechanical profile of properties is to be achieved. If SIS is not wanted in the formulations and the intention instead is to work with SBS, the SBS-containing formulations must be specially adapted in order to meet the specified profile of properties. These differences can be explained at least partly by the softness of SIS and SBS (as indicated by the Shore A hardness). The Shore A hardness is typically lower for SIS than for SBS systems.

The elastomer mixture comprises at least one polybutadiene-polyvinylaromatic block copolymer consisting of a A block and a B block, this being referred to as a diblock copolymer. Diblock copolymers contribute to tack and flow-on behaviour of the adhesive. The elastomer mixture further comprises a triblock copolymer or a higher multiblock copolymer, having at least two A blocks and at least one B block. This copolymer, as a triblock copolymer, may have a linear A-B-A structure. It is likewise possible to use block copolymers in radial form and star-shaped and linear multiblock copolymers. Triblock and multiblock copolymers contribute to cohesion and tensile strength in the adhesive.

A plurality of different diblock copolymers may be used. A plurality of triblock and/or multiblock copolymers may be used. The total block copolymer content of the adhesive is at least 42 wt % and at most 55 wt %, preferably at most 50 wt %. Significantly smaller fractions of elastomer lead to inadequate cohesion, which is manifested in reduced holding power and/or reduced tear resistance during the detachment process carried out with extensive stretching. Significantly higher fractions of elastomer lead to a drop in bond strength, particularly on nonpolar substrates such as nonpolar paint, for example. The fraction of diblock copolymers, based on the total block copolymer content, in the adhesive formulation is at least 32 wt % and at most 55 wt %, preferably at most 50 wt %. Significantly higher diblock fractions lead to inadequate cohesion, which is manifested in reduced holding power and/or reduced tear resistance during the detachment process carried out with extensive stretching. Significantly lower diblock fractions lead to a drop in bond strength, particularly on nonpolar substrates such as nonpolar paint, for example. Accordingly, the fraction of triblock or higher multiblock copolymer is from 45 wt % to 68 wt %, preferably 50 wt % to 68 wt %, in relation to the total block copolymer content. Among the triblock or higher multiblock copolymers, particular preference is given to the triblock copolymers.

The weight-average molar mass (measured according to test I) of the block copolymers is between 50 000 g/mol and 500 000 g/mol, preferably between 75 000 g/mol and 200 000 g/mol. The fraction of vinylaromatic block in the block copolymers may be different from one kind of block copolymer to another in the formulation, but is typically at least 15 wt %, preferably at least 25 wt %, and at most 40 wt %, preferably at most 35 wt %. Too small a polyvinylaromatic fraction leads to inadequate physical crosslinking, which in the polybutadiene block copolymers is produced by microphase separation. The physical crosslinking is important for the holding power and the tear strength. With too high a polyvinylaromatic fraction, conversely, the adhesive loses tack.

The block copolymers of the pressure-sensitive adhesives preferably possess polystyrene end blocks as A blocks. Instead of the preferred polystyrene blocks, it is also possible as vinylaromatics to utilize polymer blocks based on other aromatic-containing homopolymers and copolymers (preferably $C_8$ to $C_{12}$ aromatics) having glass transition temperatures of greater than 75° C., such as α-methlystyrene-containing aromatic blocks, for example. In addition, it is also possible for identical or different A blocks to be present. Glass transition temperatures are determined according to test II.

A blocks in the context of this invention are also referred to as "hard blocks". B blocks, accordingly, are also called "soft blocks" or "elastomer blocks". This reflects the selection of the blocks in accordance with the invention, according to their glass transition temperatures (for A blocks, at least 40° C., more particularly at least 60° C., and for B blocks up to at most −50° C., more particularly at most −80° C.). These details refer to the pure, unblended block copolymers.

The polybutadiene block copolymers resulting from the A and B blocks may comprise identical or different B blocks, in relation more specifically to microstructure (relative ratio of the 1,4-cis, 1,4-trans, and 1,2-vinyl monomer linkage types possible for butadiene: preference is given to a 1,4 fraction (cis+trans) of >75%, very preferably of >85%, based on the polybutadiene blocks, and a 1,4 cis fraction of >40%, based on the polybutadiene blocks) and/or chain length. A high fraction of 1,4 linkage and more particularly 1,4-cis linkage of the monomer units in the polybutadiene blocks leads to advantageous stress/strain characteristics, resulting in sufficient extensibility, which is important in particular for the residue-free redetachment by stretching. The 1,2-vinyl units may be hydrogenated units. Advantageously, the 1,4 units are substantially unhydrogenated units.

(b) Tackifier Resin

Tackifier resins are special compounds having a low molar mass by comparison with the elastomers, typically with a molecular weight (test I) $M_w$<5000 g/mol. The molecular weight $M_w$ is typically from 500 to 5000 g/mol, preferably from 500 to 2000 g/mol. The at least one tackifier resin has a DACP (according to test III) of at least about +5° C. and at most about +50° C., preferably of at most about +45° C., and also an MMAP (according to test IV) of at least about +50° C. and at most about +85° C., preferably of at most about +80° C. With tackifier resins selected correspondingly, compatibility with the polybutadiene blocks and incompatibility with polyvinylaromatic blocks can be expected, in a manner which is favorable for the purposes of this invention. The tackifier resin has a resin softening temperature (according to test V) of at least about 90° C., preferably of at least about 110° C., and of at most +140° C., preferably of at most +120° C. The at least one tackifier resin used is advantageously a hydrocarbon resin.

Excessive polarity (excessively low DACP) leads to incipient compatibility with the vinylaromatic blocks, and this can lead to reduction in cohesion and hence in tensile strength. Inadequate polarity (DACP too high) leads to incompatibility of the tackifier resin with the soft block, and therefore to a loss of pressure-sensitive adhesive tack.

Excessively high aromaticity (MMAP too low) leads to incipient compatibility with the vinylaromatic blocks, and this can lead to a reduction in cohesion and hence in tensile strength. Inadequate aromaticity (MMAP too high) leads to incompatibility of the tackifier resin with the soft block, and therefore to a loss of pressure-sensitive adhesive tack.

The resins are selected preferably from the resin classes of the (partially) hydrogenated aromatically modified C5 resins, the polyterpene resins (prepared from α-pinene, β-pinene, δ-limonene, or mixtures of these starter materials), the partially hydrogenated C9 resins, the (partially) hydrogenated aromatically modified α-pinene resins, the (partially) hydrogenated aromatically modified β-pinene resins, the (partially) hydrogenated aromatically modified δ-limonene resins, and the (partially) hydrogenated aromatically modified dipentene resins. In the case of the aromatic modification, styrene is preferred. Polyterpene resins are especially preferred.

(c) Optional Plasticizing Resins

The optionally employable plasticizing resin serves for final fine-tuning of the cohesion/adhesion balance. The resin in question very preferably comprises a plasticizing resin or plasticizing resin mixture with a melt viscosity of at least 25 Pa*s, preferably of at least 50 Pa*s, at 25° C. and 1 Hz, and with a softening temperature of <25° C. The melt viscosity is determined according to test VI. The plasticizing resin may be a rosin-based or very preferably a hydrocarbon-based plasticizing resin. The plasticizing resin or plasticizing resin mixture is employed, in relation to the total adhesive formulation, with a fraction of 0 wt %, preferably of at least 5 wt % and at most 15 wt %, more preferably at most 12 wt %, based on the total adhesive composition. Too high a fraction of plasticizing resin results in a reduction in cohesion, which is manifested in the holding power and in the tensile strength.

Customary low-viscosity plasticizers such as mineral oils are disadvantageous for the purposes of this invention. Their fraction in the total formula is preferably not more than 1 wt %, and very preferably no such plasticizers at all are used.

A disadvantage of low-viscosity plasticizers is the risk of grease saturation on absorbent bond substrates such as woodchip wallpaper. When the adhesive strip is redetached, an unwanted visible sign is left at the bond site.

(d) Optional Further Additives

The adhesive may be admixed with further additives, especially inhibitors. These include aging inhibitors of primary and secondary types, light stabilizers and UV protectants, and also flame retardants, and additionally fillers, dyes, and pigments. The adhesive may accordingly be given any desired color or may be white, gray, or black.

Typical usage amounts for an additive are up to 1 wt %, based on the total adhesive composition. Particularly advantageous are aging inhibitors which do not leave color residues on bonding substrates (in this regard see the prior art of EP 1 341 862 B1).

Fillers can be used in higher quantities, typically in a fraction of up to 5 wt %, based on the total adhesive composition.

Additives which can typically be utilized are as follows:
- primary antioxidants such as sterically hindered phenols, for example
- secondary antioxidants, such as phosphites or thioethers, for example
- processing stabilizers such as C-radical scavengers, for example
- flame retardants
- light stabilizers such as UV absorbers or sterically hindered amines, for example
- dyes and/or pigments (e.g., carbon black)
- processing assistants
- (nano)fillers such as, for example, silicon dioxide, aluminum oxide, titanium dioxide, or phyllosilicates, and color pigments and dyes (for transparent embodiments which nevertheless have deliberate coloring), and also optical brighteners
- endblock reinforcing resins, and
- optionally further polymers, preferably elastomeric in nature; elastomers utilizable accordingly include, among others, those based on pure hydrocarbons, as for example polybutadiene, elastomers with substantial chemical saturation such as, for example, saturated ethylene-propylene copolymers, α-olefin copolymers, polyisobutylene, butyl rubber, ethylene-propylene rubber, and also chemically functionalized hydrocarbons such as, for example, halogen-containing, acrylate-containing, and allyl or vinyl ether-containing polyolefins.

The selection of additives is preferably confined to those specified above.

The profile of properties of formulations of the invention is as follows:

| Property | Physical measured variable | Unit | Value (or range of values) | Measurement method |
|---|---|---|---|---|
| Cohesion | Tip-shear withstand time on wallpaper | Days (d) | ≥20 days | Test VII |
|  | Shear withstand time, 40° C. | Minutes | ≥5000 min | Test VIII |
| Adhesion | Peel adhesion on PE | N/cm | ≥5.0 N/cm | Test IX |
| Detachment behavior | Stripping force | N/cm | ≤14 N/cm | Test X |

For strippable self-adhesive products, moreover, the resistance to tears is important, enabling an assurance to be given that the adhesive product does not tear during detachment by extensive stretching. One indicator of this is the tensile strength (test XI). It ought advantageously to be at least 5.0 MPa, preferably at least 8.0 MPa. A tensile strength of at least 8.0 MPa is necessary if the adhesive products have a comparatively low layer thickness of the adhesive formulation of the invention (e.g., less than 500 μm). Additionally, a further layer may be introduced into the self-adhesive product, this layer being, for example, a carrier material or a further layer of adhesive, which brings a higher tensile strength. In this case, the tensile strength of the adhesive formulation can also be lower. Moreover, the resistance to tears is dependent on the stripping force. The higher this force, the higher also the requirements imposed on the tensile strength of the self-adhesive product. Conversely, self-adhesive products with a relatively low stripping force allow tensile strengths which are situated at a relatively low level. Relatively low stripping forces, moreover, permit gentler redetachment from sensitive adhesion substrates such as woodchip wallpaper or plaster, thereby making it possible more effectively to prevent destruction during detachment.

The present invention relates, furthermore, to adhesive tapes as well, especially strip adhesive tapes, comprising an adhesive of the invention.

Typical product constructions are adhesive tapes (adhesive transfer tapes), adhesive sheets, and diecuts (adhesive strips). Where no carrier layer present permanently in the adhesive tape is employed, layer thicknesses of the layers of adhesive are at least 25 μm and up to 2 mm. Especially preferred layer thicknesses are between about 100 μm and about 1000 μm Diverse possibilities for application are also conceivable for adhesive tapes between about 100 μm and about 400 μm, or between about 500 μm and about 800 μm. The tear resistance is dependent on factors including the layer thickness. Accordingly, layer thicknesses of at least 400 μm are preferred, and those of at least 600 μm are very preferred, provided no further layers are employed, such as, in particular, the carrier material permanently present in the adhesive tape. Where adhesive layers are employed that are based on adhesives of the invention and are present on a carrier material present permanently in the adhesive tape (double-sided adhesive tapes), the layer thicknesses of these adhesive layers are at least 15 μm and preferably at most 250 μm, preferably at least 50 μm and very preferably at most 150 m.

Adhesive sheets may take on any desired dimensions in both directions. Adhesive tapes are, for example, 2 mm, 5 mm, 10 mm, 20 mm or 50 mm wide. Adhesive tapes can be present in the form of wound rolls.

The general expression "adhesive tape" in the sense of this invention encompasses all sheetlike structures such as two-dimensionally extended sheets or sheet sections, tapes with extended length and limited width, tape sections, diecuts, labels, and the like.

Diecuts typically have a length of at least 5 mm. Lengths may also be 10 mm, 20 mm, 50 mm, 100 mm or more. Widths are typically at least 2 mm. Widths may also be 5 mm, 10 mm, 20 mm, 50 mm or more.

The diecuts are typically longer than they are broad, with the stretching for redetachment then taking place advantageously along the lengthwise axis. All angles of the diecuts may be 90° or may deviate from that figure. Also possible are shapes in which the diecut tapers in at least one direction and in particular runs to a point. Edges may also be rounded.

Adhesive products, especially diecuts, may include grip tab regions, which to the upper side and/or lower side of the adhesive strip are not tacky. This region serves as a grip tab, which is pulled in order to obtain the extensive stretching, especially in the bond plane, and this region is therefore preferably made nontacky on both sides, more particularly through the application of layers of metal, plastic or paper, as described above. Alternatively, the grip tab region may be produced by irradiation, powdering, or neutralization of the adhesive. As another alternative, a varnish or a primer may be applied at the locations in question. Moreover, the surface may be altered by chemical treatment such as etching in order to generate nonadhesive zones in each case. A grip-tab film roughness $S_a$ of 0.10 to 2.00 µm, preferably of 0.15 to 0.50 µm, ensures an effective bond between film and pressure-sensitive adhesive and may therefore be selected advantageously for this purpose. The roughness in this context is defined according to ISO 25178-2:2012(E) section 4.1.7 (see also test XII).

Adhesive products are provided in particular on a release liner (preferably siliconized paper or siliconized film). The liner may be equipped for one-sided release. In that case advantageously a second ply of a liner is used in order to line the second surface (particularly in the case of diecuts). The liner may also be equipped for double-sided release. In that case it is possible to work with one liner ply (particularly in the case of adhesive tapes).

Lastly, the present invention also encompasses the use of the adhesive of the invention or of the adhesive tape of the invention for bonding on woodchip wallpaper, especially coated woodchip wallpaper, or on plaster, especially on coated plaster. The adhesive and adhesive tape of the present invention are also particularly suitable for bonding on other rough and/or easily splittable surfaces such as wood, wainscoting, wood veneers, textured wallpapers, and panels or wall boards. Typical roughnesses in the case of woodchip wallpaper may be 500 µm or even more.

Despite the fact that the core of the invention clearly lies with the use of the pressure-sensitive adhesives of the invention in single-layer, pressure-sensitive adhesive strips which are redetachable without residue or destruction by extensive stretching substantially in the bond plane, the pressure-sensitive adhesives of the invention may also be used very suitably in multilayer pressure-sensitive adhesive strips. Product thicknesses with and without carrier may be at least 100 µm and at most 2000 µm, preferably at least 250 µm and at most 1500 µm. Higher or lower product thicknesses are also conceivable.

Consequently, the concept of the invention also comprehends constructions having an extensible carrier in the middle of the adhesive strips, in which case the extensibility of the carrier must be sufficient to ensure detachment of the adhesive strip by extensive stretching. The extensibility of the carrier in this case may be equal to the extensibility of the adhesive layer based on the adhesive of the invention, or may be higher or lower. Serving as carriers may be, for example, very extensible films, which may also have been foamed.

The adhesives of the invention are also conceivable, however, on other kinds of carriers, which also need not be extensible and/or need not have been foamed. Such self-adhesive products are then of interest for other applications (e.g., double-sided adhesive tapes with a particularly well-balanced combination of laminatability and shear strength). A very advantageous combination is that of pressure-sensitive adhesives of the invention with foamed carrier films. Such foam carrier films support effective adhesion to rough surfaces, since they contribute to evening out the unevennesses in the surfaces.

Possible further applications of such self-adhesive tapes are found in DE 42 33 872 A1, DE 195 11 288 A1, U.S. Pat. No. 5,507,464 A, U.S. Pat. No. 5,672,402 A, and WO 94/21157 A1, specific embodiments are for example in DE 44 28 587 A1, DE 44 31 914 A1, WO 97/07172 A1, DE 296 23 112 U1, WO 98/03601 A1 and DE 196 49 636 A1, DE 198 13 081 A1, DE 197 23 177 A1, DE 297 23 198 A1, DE 297 23 614 U1, DE 197 56 084 A1, DE 197 56 816 A1, DE 198 42 864 A1, DE 198 42 865 A1, WO 99/31193 A1, WO 99/37729 A1, and WO 99/63018 A1.

The adhesive strip of the invention can be used advantageously in an assembly wherein the adhesive strip is bonded between two substrates, with one of the substrates being configured in such a way that a load can be affixed to it. In adhesive tape form, the term then used is, for example, that of adhesive assembly tapes. They may be carrier-free or contain a carrier, more particularly a foam carrier.

The substrate suitable for accommodating a load may be a hook body. In that case the tip-shear load resulting from the load on the substrate is transferred to the adhesive strip.

Adhesive of the invention and self-adhesive products based on this adhesive are particularly advantageous for bonding to coated woodchip wallpaper. The formulation according to the invention balances out the requirement for conformability (flow-on behavior) to the rough substrate, on the one hand, and the requirements for holding power, on the other hand, in an advantageous way. This is additionally combined, moreover, by residue-free redetachability through extensive stretching. Surprisingly, adhesive layers based on adhesives of the invention are also suitable for bonding to coated plaster, and consequently, with regard to the bonding substrate, they exhibit a decidedly universal usefulness.

It is particularly advantageous for redetachable bonding on woodchip wallpaper if adhesives of the invention are utilized as at least one layer on a foam carrier in double-sided self-adhesive strips. Such strips may carry adhesives of the invention on one side or on both sides, and such adhesives in term may be identical or different. In the case of two different adhesives, however, one adhesive may also be selected from the quantity of noninventive adhesives.

Test Methods

Test I—Molecular Weight, GPC

The weight-average molecular weight $M_w$ was determined using gel permeation chromatography (GPC). The eluent used was THF. The measurement was made at 23° C. The pre-column used was PSS-SDV, 5 µ, $10^3$ Å, ID 8.0 mm×50 mm. For separation, the columns used were PSS-SDV, 5 µ, $10^3$ and $10^4$ and $10^6$ each with ID 8.0 mm×300 mm. The sample concentration was 4 g/l; the flow rate was 1.0 ml per minute. Measurement was made against PS standards. (µ=µm; 1 Å=$10^{-10}$ m).

GPC is also an appropriate measurement method for determining the diblock fraction, if manufacturer details for a block copolymer are not available. For the block copolymers which can be used for the purposes of this invention and are produced by living anionic polymerization, the molar mass distributions are typically narrow enough to allow polymer modes, assignable to triblock copolymers on the one hand and diblock copolymers on the other, to appear with sufficient resolution from one another in the elugram. The diblock fraction can then be quantified as the integral of the corresponding molar mass signal, relative to the sum total of the integrals of the molar mass signals of the diblock mode and of the other block copolymer modes (triblock mode or mode of a higher block copolymer).

Test II—DSC

The glass transition temperature of polymer blocks in block copolymers was determined by means of dynamic scanning calorimetry (DSC). For this test, about 5 mg of the untreated block copolymer samples were weighed out into an aluminum crucible (volume 25 μl) and closed with a perforated lid. For the measurement, a DSC 204 F1 from Netzsch was used and was operated under nitrogen for inertization. The sample was first cooled to −150° C., heated to +150° C. at a heating rate of 10 K/min, and cooled again to −150° C. The subsequent second heating curve was run again at 10 K/min, and the change in the heat capacity was recorded. Glass transitions are recognized as steps in the thermogram. The glass transition temperature is evaluated as follow (in this regard, see FIG. 1). A tangent is applied in each case to the baseline of the thermogram before 1 and after 2 of the step. In the region of the step, a line 3 of best fit is placed parallel to the ordinate in such a way that the two tangents intercept, specifically such as to form two areas 4 and 5 (between the respective tangent, the line of best fit, and the measurement plot) of equal content. The point of intersection of the lines of best fit positioned accordingly and the measurement plot gives the glass transition temperature.

Test III—DACP

The DACP is the diacetone cloud point and for the purposes of the present invention is determined as follows: 5.0 g of test substance (the tackifier resin sample to be examined) are weighed into a dry test tube, and 5.0 g of xylene (isomer mixture, CAS [1330-20-7], ≥98.5%, Sigma-Aldrich #320579 or comparable) are added. The test substance is dissolved at 130° C. and then cooled down to 80° C. Any xylene that escapes is made up for with fresh xylene, such that 5.0 g of xylene are present again. Subsequently, 5.0 g of diacetone alcohol (4-hydroxy-4-methyl-2-pentanone, CAS [123-42-2], 99%, Aldrich #H41544 or comparable) are added. The test tube is shaken until the test substance has dissolved completely. For this purpose, the solution is heated to 100° C. The test tube containing the resin solution is then introduced into a Novomatics Chemotronic Cool cloud point measuring instrument and heated therein to 110° C. It is cooled down at a cooling rate of 1.0 K/min. The cloud point is detected optically. For this purpose, that temperature at which the turbidity of the solution is 70% is registered. The result is reported in ° C. The lower the DACP value, the higher the polarity of the test substance.

Regarding the determination of DACP, reference is also made to C. Donker, PSTC Annual Technical Seminar, Proceedings, pp. 149-164, May 2001.

Test IV—MMAP

MMAP is the mixed methylcyclohexane/aniline cloud point which is determined using a modified ASTM C 611 method. For the purposes of the present invention, the MMAP is determined by weighing out 5.0 g of test substance, i.e., the tackifier resin specimen under investigation, into a dry sample glass and adding 10 ml of dry aniline (CAS [62-53-3], ≥99.5%, Sigma-Aldrich #51788 or comparable) and 5 ml of dry methylcyclohexane (CAS [108-87-2], ≥99%, Sigma-Aldrich #300306 or comparable). The test tube is shaken until the test substance has dissolved completely. For this purpose, the solution is heated to 100° C. The test tube containing the resin solution is then introduced into a Novomatics Chemotronic Cool cloud point measuring instrument and heated therein to 110° C. It is cooled down at a cooling rate of 1.0 K/min. The cloud point is detected optically. For this purpose, that temperature at which the turbidity of the solution is 70% is registered. The result is reported in ° C. The lower the MMAP, the higher the aromaticity of the test substance.

Regarding the determination of DACP, reference is also made to C. Donker, PSTC Annual Technical Seminar, Proceedings, pp. 149-164, May 2001.

Test V—Resin Softening Temperature

The tackifier resin softening temperature is carried out in accordance with the relevant methodology, which is known as Ring & Ball and is standardized according to ASTM E28.

Test VI—Melt Viscosity of Plasticizing Resins

To determine the melt viscosity of the plasticizing resins, a shear stress sweep was carried out in rotation in a shear stress-regulated DSR 200 N rheometer from Rheometrics Scientific. A cone/plate measuring system with a diameter of 25 mm (cone angle 0.01002 rad) was employed; the measuring head was air-mounted and was suitable for standard force measurements. The gap was 0.053 mm and the measuring temperature was 25° C. The frequency was varied from 0.002 Hz to 200 Hz and the melt viscosity at 1 Hz was recorded.

Test VII—Tip-Shear Test

To determine the tip-shear resistance, the adhesive film 750 μm thick under test, or the carrier-containing test specimen with dimensions of 20 mm×50 mm, provided at one end on both sides with a nontacky grip tab region (obtained by laminating on a biaxially oriented polyester film 25 μm thick with dimensions of 20 mm×13 mm), is first adhered to a substrate panel (pressing time=5 sec) furnished with woodchip wallpaper (Erfurt 52, coated (lambs wool roller) with Alpina White). Bonding to the reverse side of the adhesive strip takes place centrally onto a baseplate of steel with dimensions of 40 mm×20 mm×3 mm (length×width× thickness). A steel pin 10 cm long, sitting vertically on the plate face, is fitted onto the baseplate. The specimens obtained are compressed with a force of 100 N and left in the unloaded state for 5 minutes. Following application of the selected tip-shear load, by suspension of a weight (10 N for 20 mm lever arm), a determination is made of the time before the bond fails (i.e., the tip-shear withstand time). The test conditions are 23° C. and a relative humidity of 50%. For many applications, the higher the tip-shear withstand time, the better. If 20 days are reached, the test is discontinued and the result is recorded as >20 days.

Test VIII—Shear Withstand Time at Elevated Temperatures

The test is based on PSTC-7 and takes place at 40° C. using a 1 kg weight. An aluminum foil with an etched surface is laminated as reinforcing foil to an adhesive strip specimen 250 μm in thickness. A strip of this specimen 1.3 cm wide is adhered on a polished steel plaque over a length of 2 cm and is rolled down back and forth twice using a 2 kg roller. The plaques are equilibrated for 30 minutes under test conditions (40° C.) but without a load. The test weight (1 kg) is then hung on, producing a shearing stress parallel to the bond surface, and a measurement is made of the time taken for the bond to fail. The results are reported in minutes.

Test IX—Peel Adhesion on PE

The investigation is made in accordance with PSTC-1. Polyethylene (PE) serves as a model substrate for the bonding strength on nonpolar paint.

A strip of the 250 μm thick adhesive tape specimen, with a width of 2 cm and a length of 15 cm, is lined on one of its adhesive sides with a 25 μm thick PET film, and adhered by its other adhesive-tape side to a ground steel plate. A defined adhesive bond is ensured by rolling down the strip five times back and forth using a 4 kg roller. The plate is clamped in and the self-adhesive strip is peeled via its free end on a tensile testing machine at a peel angle of 180° with a speed of 300 mm/min. The test conditions are 23° C./50% relative humidity. The results are reported in N/cm.

Test X—Stripping Force

For determining the detachment force (stripping force), an adhesive film 750 μm thick and with dimensions of 50 mm*20 mm (length*width), with a nontacky grip tab region at the upper end, is adhered between two steel plates (arranged congruently to one another) with dimensions of 60 mm×30 mm, centrally. The specimens thus obtained are pressed at a force of 500 N for 5 seconds and thereafter are left in the unloaded state for 5 minutes. The bonds are stored at 23° C. and 50% relative humidity for 24 hours. The adhesive sheet strip is extracted with a pulling speed of 1000 mm/min parallel to the bond plane and without contact (for this purpose, in a region free of adhesive sheet, a spacer corresponding to the thickness of the adhesive sheet under investigation is inserted between the steel plates) with respect to the edge regions of the two steel plates. During this procedure, the required detachment force in N is measured. The value reported is the maximum stripping force in N/cm.

Test XI—Tensile Strength

Test specimens in dumbbell form (5A test rod according to DIN EN ISO 527) are punched out from a specimen with a thickness of 750 μm. These specimens are equilibrated at 23° C. and 50% relative humidity. Using the two end pieces, a test specimen is clamped into a tensile testing machine. The test specimen is stretched at a rate of 1000 mm/min, during which the force is recorded. The tensile strength is the force recorded during elongation at break, based on the cross-sectional area of the specimen (web width x layer thickness). It is reported in MPa.

Test XII—Roughness

The surface roughness of the grip tab layer was determined using a Contour GT® 3D Optical Microscope white light interferometer from Bruker. The basis for the test was ISO 25178-602. The instrument was operated in vertical scanning (VSI) mode. A 50× objective lens and a 1× field lens were utilized, resulting in a fifty-fold magnification. The viewing region was 317 μm×238 μm. This is also the area referenced by the evaluated surface roughness $S_a$. From the height profile recorded optically, the surface roughness was obtained from the raw data in accordance with ISO 25178-2:2012 (E) section 4.1.7, as the average of the 3D profile, $S_a$. $S_a$ is the arithmetic mean of the amounts of the height values z of all points measured within the x,y plane of the viewing region. Three measurements were conducted in each case, and the mean of the individual measurements was reported in nm. The distance between the measured points was 0.5 μm in both the x- and the y-directions.

The present invention relates in particular to the following embodiments:

According to a first embodiment, the invention relates to an adhesive consisting of (a) at least one elastomer component of the type of a polybutadiene-polyvinylaromatic block copolymer having a fraction in relation to the total adhesive of 42 wt % to 55 wt %, preferably to 50 wt %, and a diblock fraction in relation to the total block copolymer content of 32 wt % to 55 wt %, preferably to 50 wt %, (b) at least one tackifier resin which is a hydrocarbon resin having a DACP of at least +5° C. and at most +50° C. and an MMAP of at least +50° C. and at most +85° C., (c) optionally at least one plasticizing resin having a fraction of 0 wt % to 15 wt %, based on the total adhesive, (d) optionally further additives.

According to a second embodiment, the invention relates to an adhesive as per embodiment 1, characterized in that the elastomer component is composed to an extent of at least 90 wt %, based on the total block copolymer content, of at least one polybutadiene-polyvinylaromatic block copolymer which comprises polymer blocks predominantly formed by polymerization of vinylaromatics (A blocks), preferably polystyrene, and blocks predominantly formed by polymerization of 1,3-butadiene (B blocks).

According to a third embodiment, the invention relates to an adhesive as per embodiment 1 or 2, characterized in that the tackifier resin is a hydrocarbon resin having a DACP of at most +45° C.

According to a fourth embodiment, the invention relates to an adhesive as per any of embodiments 1 to 3, characterized in that the tackifier resin is a hydrocarbon resin having a MMAP of at most +80° C.

According to a fifth embodiment, the invention relates to an adhesive as per any of embodiments 1 to 4, characterized in that the tackifier resin is a hydrocarbon resin having a resin softening temperature of at least +90° C., preferably at least +110° C., and at most +140° C., preferably at most +120° C.

According to a sixth embodiment, the invention relates to an adhesive as per any of embodiments 1 to 5, characterized in that it comprises at least 5 wt % and at most 15 wt % of the at least one plasticizing resin, preferably at most 12 wt %, based in each case on the total adhesive.

According to a seventh embodiment, the invention relates to an adhesive as per any of embodiments 1 to 6, characterized in that it comprises at most 1 wt %, preferably 0 wt %, based on the total adhesive of low-viscosity plasticizers.

According to an eighth embodiment, the invention relates to an adhesive tape, more particularly a self-adhesive strip redetachable by extensive stretching, comprising an adhesive as per any of embodiments 1 to 7.

According to a ninth embodiment, the invention relates to an adhesive tape as per embodiment 8, characterized in that it comprises a carrier, more particularly a foam carrier or a film carrier.

According to a tenth embodiment, the invention relates to an adhesive as per any of embodiments 1 to 7 or the adhesive tape as per embodiment 8 or 9 for bonding to woodchip wallpaper, more particularly coated woodchip wallpaper, textured wallpapers, wood, panels, wall boards, wainscoting, veneered woods, or to plaster, more particularly coated plaster.

EXAMPLES

Preparation of Specimens

All kneading compositions were produced in a heatable double-sigma kneader from Aachener Maschinenbau Kupper, model III-P1. The jacket of the kneader was heated by means of a thermal oil heating bath from Lauda. The bath temperature set in this case was 190° C. Throughout the kneading operation, there was an inert gas atmosphere of $CO_2$. The kneader was operated at 50 rpm.

The elastomers were first weighed out together with the solid aging inhibitor, Irganox 1010, and introduced into the kneader. Thereafter about 10% of the amount of solid resin was added and kneading took place for 15 minutes. Subsequently, at intervals of 10 minutes, a third of the remaining amount of tackifier resin, and also, lastly, plasticizing resin, was added and incorporated.

On conclusion of the kneading operation, the kneading compositions were taken from the kneader and cooled to room temperature.

The cooled compositions were positioned between two plies of siliconized release paper and pressed using a hot press from Lauffer GmbH & CO KG, model RLKV 25, at 130° C. to give hand specimens having a layer thickness of 100 μm, 150 μm, 250 μm, 400 μm or 650 μm (according to the test to be conducted). Depending on the particular test, the adhesive layers are laminated onto a carrier material. This was done manually using a rubber roller. The specimens were subsequently stored at 23° C. and 50% relative humidity for 2 weeks in order to ensure effective anchoring of the adhesive layers on the foam carrier.

Raw Materials Used

|  |  | Type | Manufacturer | Characterization |
|---|---|---|---|---|
| Elastomers | Kraton D1102 AS | Polystyrene-polybutadiene block copolymer | Kraton Polymers | Triblock copolymers with 17%* diblock |
|  | Kraton D1118 ES | Polystyrene-polybutadiene block copolymer | Kraton Polymers | Triblock copolymers with 78%* diblock |
| Tackifier resins | Dercolyte A115 | α-Pinene resin | DRT |  |
|  | Piccolyte A115 | α-Pinene resin | Pinova |  |
| Plasticizing resins | Wingtack 10 | C5 resin | Cray Valley |  |
| Aging inhibitor | Irganox 1010 | Sterically hindered phenol | BASF |  |

*cf. Product information on Kraton "The Global Connection for Polymer and Compound Solutions - Product and Application Guide" (KPP/TPG/2011) from 2011.

| Example 1.1 |  | wt % |
|---|---|---|
| Elastomer | Kraton D1102 AS | 39.5% |
|  | Kraton D1118 ES | 15.0% |
| Tackifier resin | Dercolyte A115 | 43.0% |
| Plasticizing resin | Wingtack 10 | 2.0% |
| Further constituents | Irganox 1010 | 0.5% |

| Example 1.2 |  | wt % |
|---|---|---|
| Elastomer | Kraton D1102 AS | 21.5% |
|  | Kraton D1118 ES | 28.0% |
| Tackifier resin | Dercolyte A115 | 45.0% |
| Plasticizing resin | Wingtack 10 | 5.0% |
| Further constituents | Irganox 1010 | 0.5% |

| Example 1.3 |  | wt % |
|---|---|---|
| Elastomer | Kraton D1102 AS | 25.0% |
|  | Kraton D1118 ES | 20.0% |
| Tackifier resin | Piccolyte A115 | 44.5% |
| Plasticizing resin | Wingtack 10 | 10.0% |
| Further constituents | Irganox 1010 | 0.5% |

| Example 1.4 |  | wt % |
|---|---|---|
| Elastomer | Kraton D1102 AS | 27.5% |
|  | Kraton D1118 ES | 16.5% |
| Tackifier resin | Piccolyte A115 | 46.0% |
| Plasticizing resin | Wingtack 10 | 9.5% |
| Further constituents | Irganox 1010 | 0.50% |

| Example 1.5 Comparative |  | wt % |
|---|---|---|
| Elastomer | Kraton D1102 AS | 40.0% |
|  | Kraton D1118 ES | 21.0% |
| Tackifier resin | Dercolyte A115 | 32.0% |
| Plasticizing resin | Wingtack 10 | 6.5% |
| Further constituents | Irganox 1010 | 0.50% |

| Example 1.6 Comparative |  | wt % |
|---|---|---|
| Elastomer | Kraton D1102 AS | 45.0% |
| Tackifier resin | Piccolyte A115 | 44.5% |
| Plasticizing resin | Wingtack 10 | 10.0% |
| Further constituents | Irganox 1010 | 0.50% |

| Example 1.7 Comparative |  | wt % |
|---|---|---|
| Elastomer | Kraton D1102 AS | 34.5% |
|  | Kraton D1118 ES | 7.0% |
| Tackifier resin | Piccolyte A115 | 38.0% |
| Plasticizing resin | Wingtack 10 | 20.0% |
| Further constituents | Irganox 1010 | 0.50% |

| Example 1.8 Comparative |  | wt % |
|---|---|---|
| Elastomer | Kraton D1102 AS | 42.0% |
|  | Kraton D1118 ES | 10.0% |
| Tackifier resin | Dercolyte A115 | 43.5% |
| Plasticizing resin | Wingtack 10 | 4.0% |
| Further constituents | Aging inhibitor | 0.50% |

| Example 1.9 Comparative |  | wt % |
|---|---|---|
| Elastomer | Kraton D1102 AS | 38.0% |
|  | Kraton D1118 ES | 15.0% |
| Tackifier resin | Dercolyte A115 | 46.5% |
| Further constituents | Aging inhibitor | 0.50% |

| Example 1.10 Comparative |  | wt % |
|---|---|---|
| Elastomer | Kraton D1102 AS | 20.0% |
|  | Kraton D1118 ES | 20.0% |
| Tackifier resin | Dercolyte A115 | 57.5% |
| Plasticizing resin | Wingtack 10 | 2.0% |
| Further constituents | Aging inhibitor | 0.50% |

| Example 1.11 Inventive | | wt % |
|---|---|---|
| Elastomer | Kraton D1102 AS | 24.0% |
| | Kraton D1118 ES | 18.0% |
| Tackifier resin | Dercolyte A115 | 45.5% |
| Plasticizing resin | Wingtack 10 | 12.0% |
| Further constituents | Aging inhibitor | 0.50% |

Results of parameter measurements:

| Example: | Total block copolymer content | Diblock fraction | Tip-shear withstand time | Shear withstand time, 40° C. | Peel adhesion on PE | Stripping force | Tensile strength |
|---|---|---|---|---|---|---|---|
| #1.1 | 54.5% | 33.8% | >20 days | >10000 min | 7.2 N/cm | 9.6 N/cm | 10.3 MPa |
| #1.2 | 49.5% | 51.5% | >20 days | >10000 min | 8.1 N/cm | 10.7 N/cm | 5.7 MPa |
| #1.3 | 45.0% | 44.1% | >20 days | >10000 min | 9.6 N/cm | 9.0 N/cm | 6.9 MPa |
| #1.4 | 44.0% | 39.9% | >20 days | >10000 min | 7.7 N/cm | 8.2 N/cm | 8.1 MPa |
| #1.5 (compar.) | 61.0% | 38.0% | 1 day | 5351 min | 1.4 N/cm | 8.0 N/cm | 7.8 MPa |
| #1.6 (compar.) | 45.0% | 17.0% | 12 days | >10000 min | 7.9 N/cm | 12.2 N/cm | 12.2 MPa |
| #1.7 (compar.) | 41.5% | 27.3% | >20 days | 2777 min | 5.3 N/cm | 6.9 N/cm | 5.9 MPa |
| #1.8 (compar.) | 52.0% | 28.7% | 4 days | >10000 min | 7.7 N/cm | 10.8 N/cm | 12.7 MPa |
| #1.9 | 53.0% | 34.3% | 5 days | >10000 min | 6.6 N/cm | 11.6 N/cm | 12.1 MPa |
| #1.10 | 40.0% | 47.5% | 2 days | >10000 min | <1.0 N/cm*) | 17.7 N/cm | 6.7 MPa |
| #1.11 | 42.0% | 43.0% | >20 days | 8855 min | 14.2 N/cm | 9.9 N/cm | 5.7 MPa |

*)delaminated from the test substrate in the measurement

Examples 1.1 to 1.4 show that formulations with compositions of the invention meet the stated requirements. Comparative example 1.5 shows that too high a total block copolymer content is a disadvantage, even though the diblock fraction is situated within the range that is advantageous for the purposes of this invention. Comparative examples 1.6 and 1.8 show that the holding power on woodchip wallpaper is not achieved if the composition selected has too low a diblock fraction. Comparative example 1.7 shows that too high a fraction of plasticizing resin is detrimental to the thermal shear strength.

From comparative example 1.9 it is evident that too high an amount of block copolymer within the elastomer component results in a distinct reduction in the holding power on wallpaper. This formulation illustrates how demanding the problem is of balancing the constituents in such a way as to achieve a tip-shear strength in accordance with requirements. Despite the fact that the static shear strength at 40° C. and the peel adhesion on PE are both at the properly required level, the dissipative and elastic fractions of the adhesive are evidently not well-balanced enough for sufficient tip-shear strength. Inadequate holding power on wallpaper is likewise found if the block copolymer content is too low (comparative example 1.10). This can be explained by a less-pronounced cohesion. Overall, a formulation of this kind is already very stiff, as also evident from the inadequate bondability on PE, where delamination of the adhesive tape is observed right at the beginning of the peeling experiment. Inventive example 1.11, lastly, shows that the requisite tip-shear strength is achieved in the case of a slightly increased block copolymer fraction.

Examples 1.1 to 1.4 show properties of formulations in use as carrier-free, single-layer self-adhesive products. Formulations according to the invention, however, are also outstandingly suitable in combination with carrier materials. To show this, examples 2.1 to 2.7 are given.

| Example: | Adhesive 1 layer thickness | Carrier | Adhesive 2 Layer thickness | Tip-shear withstand time |
|---|---|---|---|---|
| #2.1 (Strip) | 1.1 150 μm | Foam 1 Alveo TA 1000.8 | 1.1 150 μm | >20 days |
| #2.2 (Strip) | 1.2 150 μm | Foam 1 Alveo TA 1000.8 | 1.8 150 μm | >20 days |
| #2.3 (Strip) | 1.1 150 μm | Foam 2 Alveo TL 1501 | 1.1 150 μm | >20 days |
| #2.4 (Strip) | 1.2 400 μm | Platilon 4100D (Epurex) 50 μm | 1.2 400 μm | >20 days |
| #2.5 (Adhesive assembly tape) | 1.1 100 μm | Foam 1 Alveo TA 1000.8 | 1.1 100 μm | >20 days |
| #2.6 (Adhesive assembly tape) | 1.1 100 μm | Foam 2 Alveo TL 1501 | 1.1 100 μm | >20 days |
| #2.7 (Adhesive assembly tape) | 1.2 400 μm | PET film 12 μm | 1.2 400 μm | >20 days |

The invention claimed is:

1. An adhesive comprising:
   (a) an at least one elastomer comprising a total block copolymer content;
   (b) an at least one tackifier resin comprising a hydrocarbon resin having a diacetone cloud point value of at least 5° C. and at most 50° C. and a mixed methylcyclohexane/aniline cloud point value of at least 50° C. and at most 85° C.; and
   (c) an at least one plasticizing resin present at 0-15 wt % based on the total weight of the adhesive, wherein:
the total block copolymer content comprises an at least one polybutadiene-polyvinylaromatic block copolymer present at 42-50 wt % based on the total weight of the adhesive; and
the polybutadiene-polyvinylaromatic block copolymer comprises a diblock fraction present at 32-55 wt % based on the total weight of the total block copolymer content.

2. The adhesive as claimed in claim 1, wherein:
the at least one polybutadiene-polyvinylaromatic block copolymer is present at at least 90 wt % based on the total block copolymer content;
the at least one polybutadiene-polyvinylaromatic block copolymer comprises a plurality of polymer blocks predominantly formed by polymerization of an at least one vinylaromatic (A blocks) and a plurality of polymer blocks predominantly formed by polymerization of an at least one 1,3-butadiene (B blocks).

3. The adhesive as claimed in claim 1, wherein the hydrocarbon resin has a diacetone cloud point value of at most 45° C.

4. The adhesive as claimed in claim 1, wherein the hydrocarbon resin has a mixed methylcyclohexane/aniline cloud point value of at most 80° C.

5. The adhesive as claimed in claim 1, wherein the hydrocarbon resin has a resin softening temperature of at least 90° C. and at most 140° C.

6. The adhesive as claimed in claim 1, wherein the at least one plasticizing resin is present at 5-15 wt % based on the total weight of the adhesive.

7. The adhesive as claimed in claim 1, further comprising a low-viscosity plasticizer present at at most 1 wt % based on the total weight of the adhesive.

8. An adhesive tape comprising an adhesive as claimed in claim 1.

9. The adhesive tape as claimed in claim 8, comprising a foam carrier or a film carrier.

10. A method comprising bonding a surface to a coated woodchip wallpaper, a textured wallpaper, wood, a panel, a wall board, a wainscoting, veneered wood, or plaster with the adhesive as claimed in claim 1.

* * * * *